(12) United States Patent
Hünger et al.

(10) Patent No.: US 6,429,279 B1
(45) Date of Patent: Aug. 6, 2002

(54) PREPARATION OF POLYAMIDES

(75) Inventors: Hans-Harald Hünger, Ellerstadt; Alfons Ludwig, Höxter; Rainer Neuberg, Dannstadt-Schauernheim; Gunter Pipper, Bad Dürkheim; Thomas Sauer, Dirmstein; Axel Wilms, Weisenheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/554,216
(22) PCT Filed: Nov. 24, 1998
(86) PCT No.: PCT/EP98/07579
§ 371 (c)(1), (2), (4) Date: May 11, 2000
(87) PCT Pub. No.: WO99/26997
PCT Pub. Date: Jun. 3, 1999

(30) Foreign Application Priority Data

Nov. 25, 1997 (DE) .......................................... 197 52 181

(51) Int. Cl.$^7$ ........................ C08G 69/04; C08G 69/16; C08G 69/46
(52) U.S. Cl. ........................ 528/310; 528/312; 528/323; 528/480; 528/499
(58) Field of Search .................. 528/310, 312, 528/323, 480, 499

(56) References Cited

U.S. PATENT DOCUMENTS

| | | | |
|---|---|---|---|
| 4,049,638 A | 9/1977 | Doerfel et al. | 260/78 |
| 4,053,457 A | 10/1977 | Cordes et al. | 260/78 |
| 4,816,557 A | 3/1989 | Pipper et al. | 528/500 |
| 4,879,120 A | 11/1989 | Wehr | 524/430 |
| 5,077,381 A | 12/1991 | Dellinger | 528/323 |
| 5,674,973 A | 10/1997 | Pipper et al. | 528/323 |
| 5,703,204 A | 12/1997 | Gittinger et al. | 528/486 |
| 5,777,067 A | 7/1998 | Sato et al. | 528/310 |
| 5,973,105 A * | 10/1999 | Wiltzer et al. | 528/323 |
| 6,069,228 A * | 5/2000 | Alsop et al. | 528/310 |
| 6,107,449 A * | 8/2000 | Wiltzer et al. | 528/323 |

FOREIGN PATENT DOCUMENTS

| | | |
|---|---|---|
| DE | 213-936 | 9/1984 |
| EP | 123881 | 10/1984 |

OTHER PUBLICATIONS

Fourne' "Synthetische Fasern" (1995) pp. 37–57. The month in the date of publication is not available.

Karasiak "Optimized and Modern Polymer Plants Demonstrated at a Continuous Nylon 6 Polymer Production Plant" IFJ (1996) pp. 22,24,26,29–31. The month in the date of publication is not available.

Ullman's Encyclopedia of Industrial Chemistry, Fifth, Completely Revised Edition, vol. A21, pp. 179–205, 1992. The month in the date of publication is not available.

\* cited by examiner

*Primary Examiner*—P. Hampton-Hightower
(74) *Attorney, Agent, or Firm*—Keil & Weinkauf

(57) ABSTRACT

The disclosure is a process for preparing polyamides by concentrating the wash water extract from the extraction of polyamide to an extractables content of not more than 85% by weight, adding fresh lactam down to a water content of from 0.5 to 13% by weight, and effecting at least one adiabatic expansion during the polymerization.

15 Claims, 2 Drawing Sheets

PREPARATION OF POLYAMIDES

The present invention relates to a process for preparing polyamides from a mixture of at least one lactam and water under polyamide-forming conditions wherein at least one adiabatic expansion is effected during the polymerization.

Polyamide, widely prepared by polymerization of caprolactam, has an equilibrium content, depending on the temperature, of from 8 to 15% of caprolactam monomer and caprolactam oligomers. These cause undesirable effects in further processing of the polymer product and are therefore usually removed by extraction with water, caprolactam-comprising water or alcohol or treatment with inert gases or vacuum treatment after pelletization.

The extraction with water typically gives rise to a wash water extract comprising from about 2 to 15% by weight of caprolactam monomer and caprolactom oligomers, which is processed for economic and environmental protection reasons to recover the caprolactam monomer and oligomer for recycling into the polymerization.

DESCRIPTION OF THE RELATED ART

Accordingly, DD-A-213 936, DE-A-43 21 683 and U.S. Pat. No. 4,049,638, for example, describe processes for polycaprolactam preparation which permit the use in the polymerization of caprolactam having a water content of up to 15%. EP-A-745 631 discloses the reuse of aqueous extract solutions through addition of small amounts of a di- or polycarboxylic acid, since the extract will polymerize slower than caprolactam otherwise.

Since the extract further comprises appreciable proportions of cyclic oligomers which remain unchanged by the polymerization, various processes have been proposed for cracking these oligomers or converting them into linear oligomers. The oligomers are typically cracked with phosphoric acid or by means of high temperatures. For instance, U.S. Pat. No. 5,077,381 describes a process for cracking the oligomers at from 220 to 290° C., preferably under super-atmospheric pressure. The use of acetic acid and orthophosphoric acid for oligomer cracking is described in DD-A-213 936, for example.

Prior to recycling into the polymerization, the typically about 10% strength by weight extract first has to be worked up, i.e., typically by concentrating it. The workup normally takes the form of removing the water by distillation. DE-A-25 01 348 describes concentrating to more than 70% by weight in the absence of atmospheric oxygen by addition of fresh caprolactam to the wash water extract prior to the concentrating. EP-A-123 881 discloses the addition of caprolactam to the extract prior to the concentrating to prevent any precipitation of oligomers.

The concentrating is typically carried out in two stages. In the first stage, the 10% strength solution is concentrated to about 75–80% of caprolactam and oligomers using conventional evaporating means. After further evaporation of the solution to >98%, the solution is polymerized at once. The aqueous solution of caprolactam and caprolactam oligomers is not stable in storage at concentrations above 70–80%, since the oligomers in particular precipitate.

When this method of concentrating is applied to wash water extract from pigmented polyamides, problems arise, however. The polyamide comprises delustering $TiO_2$ pigments added before the pelletization, preferably during the polymerization. These delustering $TiO_2$ pigments are additionally surface-treated or coated with inorganic additives to improve UV light stability and to impart certain properties, such as dispersibility and particle size. On extraction of the polyamide chips, these inorganic assistants are partly extracted with the caprolactam and caprolactam oligomers and then separate out during the concentrating of the wash water extract, especially on the surfaces of the heat exchanger. This appreciably shortens the service life of the evaporation equipment and additionally gives rise to the possibility of blocking the heat exchanger. Similar problems with a coating of heat exchanger surfaces arise during the evaporation of water in the polymerization stage when the concentrate is recycled back into the caprolactam polymerization, since the concentrate likewise still includes these inorganics.

By way of solution to these problems, EP 306 872 proposes using pigments comprising less than 0.1% by weight of 100° C. water solubles. However, this restriction to the choice of pigments is disadvantageous.

BRIEF SUMMARY OF THE INVENTION

It is an object of the present invention to provide an improved process for working up and further processing the wash water extract of polyamides, especially pigmented polyamides, to produce, in a simple manner and without the aforementioned problems, a concentrated extract which can be recycled into the polymerization.

We have found that, surprisingly, this object is achieved when the wash water extract is concentrated to an extractables content of not more than 85% by weight and this solution is mixed with fresh lactam in a ratio of from 1:1 to 1:8. The resulting mixture then comprises from 0.5 to 13% by weight of water. It can be recycled into the polymerization without the aforementioned problems when the water is removed by adiabatic expansion during the polymerization.

The present invention accordingly provides a process for preparing polyamides from at least one lactam, especially caprolactam, with or without further monomers and customary additives and fillers, which comprises a) concentrating the wash water extract from the extraction of polyamide to an extractables content of not more than 85% by weight, b) adjusting the water content of the resulting concentrate to from 0.5 to 13% by weight by addition of fresh lactam, c) subjecting the resulting mixture to a polymerization under polyamide-forming conditions, and d) effecting at least one adiabatic expansion during the polymerization to reduce the water content.

Figure 1:
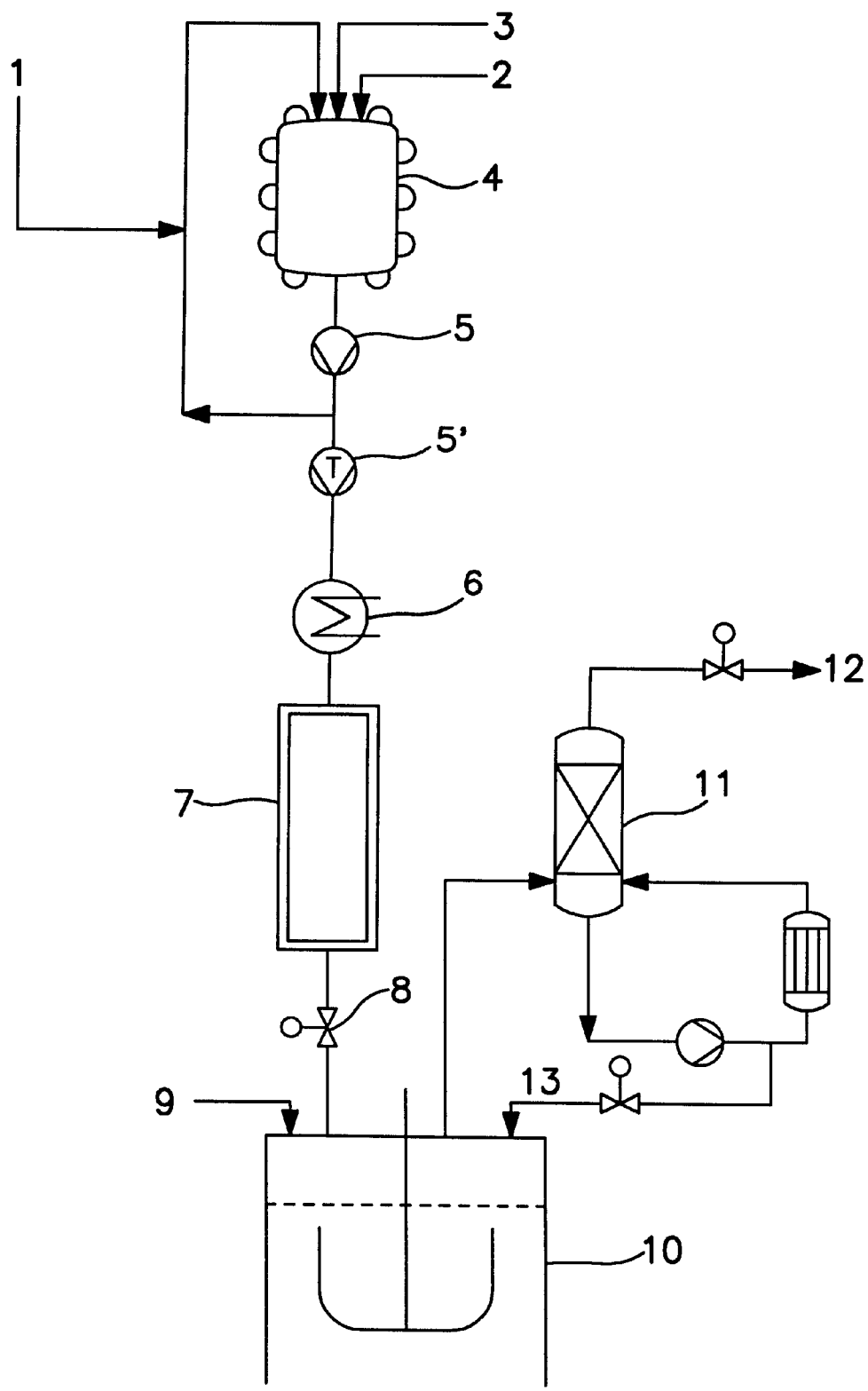
FIG. 1 shows schematically an embodiment of the process of the present invention featuring single-stage flash evaporation.

The process of the present invention is significantly more robust, simpler and more economical than the prior art. With wash water extract from the extraction of pigmented polyamide, the precipitation of inorganics from the extract and the formation of a coating of these inorganics, especially on heat exchanger surfaces, are avoided. It has further been found that the composition of the mixture used speeds up the polymerization.

The extract waters from a polyamide extraction generally have an organics, with or without inorganics, content of from 4 to 15% by weight. For recycling into the polymerization, these extract waters first have to be concentrated. This takes place in a conventional manner in a single- or multiple-stage evaporation apparatus having a short residence time, for example in a Robert evaporator, falling-film evaporator, thin-film evaporator or recirculation evaporator. The evaporating is carried on to an extractables content of not more than 85% by weight, since this concentration is still sufficiently low for no precipitations of solute to have been observed. Preferably, the evaporating is carried on to an extractables content of from 60 to 85% by weight, especially of from 70 to 85% by weight. The evaporating temperatures are generally within the range from 103 to 115° C., preferably within the range from 107 to 112° C. (at atmospheric pressure). The evaporating is generally carried out continuously.

It is particularly preferable for fresh lactam to be added to the wash water extract prior to the concentrating, especially if the extraction of the polyamide was not carried out with caprolactam-comprising water. This has the advantage that the concentrated extract is stabilized against oligomer precipitation even during the concentrating. The weight ratio of added caprolactam to extractables content is chosen within the range from 0.1 to 1.5, preferably within the range from 0.5 to 1.

The concentrated extract obtained after the concentrating generally has a temperature within the range from 107 to 112° C. and is subsequently admixed with the lactam monomer to be polymerized. Sufficient lactam is used for the resulting mixture to have a water content of from 0.5 to 13% by weight, preferably of from 0.5 to 10% by weight, particularly preferably of from 0.8 to 7% by weight, especially of from 1 to 4% by weight, and particularly preferably of from 1.9 to 3.5% by weight. To establish this water content, the concentrated extract is generally mixed with the lactam in a weight ratio of from 1:1 to 1:12, preferably of from 1:1 to 1:10, especially of from 1:1 to 1:8. The high lactam content (generally within the range from 79 to 95% by weight) improves the solubility of the oligomers present in the mixture, so that no precipitation is observed. The mixture is therefore stable and can be stored for at least several hours until further processing without any blockages in the equipment being observed.

The mixture is then subjected to a polymerization, which is generally carried out continuously and essentially according to the process described in DE-A-43 21 683. The polymerization is preferably carried out under conditions where the mixture forms a single liquid phase, i.e., at elevated temperature and superatmospheric pressure. In general, the temperature employed will be within the range from 230 to 310° C., preferably within the range from 240 to 290° C., and the pressure within the range from 5 to 40 bar, preferably within the range from 12 to 20 bar.

The water present in the mixture catalyzes the polymerization under the polymerization conditions. However, to obtain high molecular weight polyamide, the water content has to be considerably reduced. This is accomplished by adiabatically expanding the polymerization mixture, preferably to a pressure within the range from 0.1 mbar to 1.8 bar, especially within the range from 1 mbar to 1.3 bar, particularly preferably to atmospheric pressure. Owing to the adiabatic release or, to be more precise, evaporation of the water, no oligomers or additives can separate out onto the equipment. On the contrary, they remain dissolved or suspended in the polymer matrix, ensuring trouble-free progress of the polymerization.

In a first embodiment, the mixture to be polymerized is brought to a temperature within the range from 230 to 310° C. and to a pressure within the range from 5 to 40 bar, initiating the polymerization. Once the desired temperature and the desired pressure have been reached, at least one adiabatic expansion (as more particularly described below) is carried out. The product obtained after said expansion is subjected to an atmospheric or reduced pressure postpolymerization in accordance with known processes in at least one reaction zone.

Preferably, however, the product obtained after said expansion is further polymerized in a first reaction zone at a temperature within the range from 230 to 310° C. and at a pressure within the range from 5 to 40 bar, then subjected to another adiabatic expansion and finally postpolymerized in a second reaction zone as described above. The further polymerization in the first reaction zone is generally carried out in a reaction vessel as more particularly described below.

In a further embodiment, the mixture to be polymerized is brought to a temperature of from 230 to 310° C. and to a pressure of from 5 to 40 bar, for example by passing the mixture continuously through a heated heat exchanger within a few minutes. The product is subsequently polymerized incipiently in a first reaction zone by maintaining the pressure and temperature conditions. The polymerization is generally effected in a reaction vessel having internal fitments, for example a tubular reactor having mixing elements. These can be structured mixing elements (e.g. Sulzer packings) or unstructured mixing elements such as random packings (e.g., Raschig rings, balls or Pall rings). This reaction zone is the site of an exothermic polymerization of the reaction mixture, and appropriate pressure and temperature conditions are employed for the aforementioned reasons to ensure that the reaction system forms a single phase. The heat of reaction evolved raises the temperature of the reaction mixture by from about 10 to 50° C. in the course of the zone. The residence time is generally within the range from 0.5 to 3 hours, preferably within the range from 1 to 2 hours, so that the conversion is not less than 85%, preferably more than 87%.

The pressurized reaction mixture is subsequently adiabatically expanded in a separation zone. The pressure in this separation zone is generally within the range from 0.1 mbar to 1.5 bar, preferably within the range from 10 to 1300 mbar. The expansion results in a flash evaporation of the water still present in the polymer through utilization of the heat of reaction or enthalpy previously stored in the polymer melt. The reaction mixture cools down to temperatures within the range from 220 to 300° C., preferably within the range from 230 to 270° C. In contrast to a conventional evaporation of water on a heat exchanger surface, it is impossible, as already mentioned, for precipitations onto heat exchanger surfaces and other apparatus surfaces to take place from the polymer matrix in the course of a flash evaporation. Fouling due to organic or inorganic precipitations is avoided. In addition, the heat released in the process is directly utilized for water evaporation, yielding a further energy and cost saving. Moreover, a cooling down of the reaction mixture is desirable, since a lower temperature will shift the polycondensation equilibrium to the side of the higher molecular weight product. The water vapor released in the course of the expansion comprises volatile constituents such as caprolactam monomer and caprolactam oligomers. Column rectification can be used to remove the water vapor from the system and to recycle the organics into the process.

The polycaprolactam obtained after the separation zone when caprolactam is used as monomer has a molecular weight within the range from 3000 to 18,000 g/mol, preferably within the range from 6000 to 12,000 g/mol. The melt viscosity is within the range from 1 to 200 Pa.s (at 270° C.). On exit from the separation zone, the polymer melt is either immediately transferred into a postreaction zone, where the molecular weight is increased further, or directly brought into piece form in a conventional manner.

Flash evaporation in two or more stages is especially advantageous when the water concentration in the concentrated, lactam-diluted extract is above 8%. Flash evaporation in two or more stages prevents any drop in the temperature of the reaction mixture to below the polymer melt temperature during the adiabatic evaporation.

The mixture of concentrated extract and lactam with a water content of more than 8% is heated up as described above and passed into the first reaction zone, where the reaction heats it up further. The pressure is preferably again chosen so that the reaction mixture is present as a single liquid phase.

The pressurized reaction mixture is then adiabatically expanded into a first separation zone, where the pressure is within the range from 6 to 15 bar, preferably within the range from 8 to 12 bar. Some of the water present in the polymer flash evaporates through utilization of the heat of reaction and enthalpy previously stored. The reaction mixture cools down to from about 220 to 300° C., preferably to within the range from 230 to 270° C. The residence time in the first separation zone is generally chosen within the range from 10 to 60 minutes, preferably within the range from 20 to 30 minutes. The pressurized mixture is then passed through a heat exchanger and heats up within a few minutes to temperatures within the range from 230 to 310° C., preferably within the range from 240 to 290° C. The pressure is preferably again set so that the reaction mixture is present as a single liquid phase; the pressure is generally within the range from 6 to 20 bar, preferably within the range from 12 to 18 bar. The reaction mixture is then again adiabatically expanded in a second separation zone. The pressure in the second separation zone is set within the range from 10 to 1300 mbar. This operation of reheating the reaction mixture followed by a flash evaporation can be repeated, if necessary. The amount of water evaporated in the various separation zones and the attendant temperature decrease can be controlled in a specific manner by means of the particular pressure employed.

The lactam used can be, for example, caprolactam, enanthlactam, capryllactam and lauryllactam and also mixtures thereof, preferably caprolactam.

Further possible monomer units are, for example, dicarboxylic acids, such as alkanedicarboxylic acids having from 6 to 12 carbon atoms, especially from 6 to 10 carbon atoms, such as adipic acid, pimelic acid, suberic acid, azelaic acid or sebacic acid, and also terephthalic acid and isophthalic acid, diamines, such as $C_4$–$C_{12}$-alkyldiamines, especially having from 4 to 8 carbon atoms, such as hexamethylenediamine, tetramethylenediamine or octamethylenediamine, also m-xylylenediamine, bis(4-aminophenyl)methane, bis(4-aminophenyl)-2,2-propane or bis(4-aminocyclohexyl)methane, and also mixtures of dicarboxylic acids and diamines, advantageously in an equivalent ratio, such as hexamethylene diammonium adipate, hexamethylene diammonium terephthalate or tetramethylene diammonium adipate, preferably hexamethylene diammonium adipate and hexamethylene diammonium terephthalate, in amounts ranging from 0 to 60%, preferably from 10 to 50%, by weight, based on total monomers. Particular industrial importance has been acquired by polycaprolactam and polyamides polymerized from caprolactam, hexamethylenediamine and also adipic acid, isophthalic acid and/or terephthalic acid.

In a preferred embodiment, caprolactam and hexamethylene diammonium adipate ("66 salt") are used, the 66 salt being employed in the form of an aqueous solution. The molar ratio of caprolactam to 66 salt is customarily chosen within the range from 99.95:0.05 to 80:20, preferably within the range from 95:5 to 85:15.

Possible customary additives and fillers are pigments, such as titanium dioxide, silicon dioxide or talcum, chain regulators, such as aliphatic and aromatic carboxylic and dicarboxylic acids, such as propionic acid or terephthalic acid, stabilizers, such as copper(I) halides and alkali metal halides, nucleating agents, such as magnesium silicate or boron nitride, catalysts, such as phosphorous acid, and also antioxidants in amounts ranging from 0 to 5% by weight, preferably from 0.05 to 1% by weight, based on total monomers. The additives are generally added prior to the pelletizing and before, during or after, preferably after, the polymerization.

The polymer obtained according to the present invention can then be further processed in a conventional manner, for example brought into piece form in a conventional manner by extruding it in the form of melt profiles, passing these through a water bath to cool them and then pelletizing them to form chips. The chips can then be conventionally extracted and subsequently or simultaneously converted into high molecular weight polylactam. The extraction can be carried out with, for example, water or aqueous caprolactam solution. Another possibility is gas phase extraction, see EP-A-284 968. The desired end product viscosity is generally within the range from 120 to 350 ml/g. It can be set in a conventional manner.

FIG. 1 schematically depicts by way of example an embodiment of the process of the present invention. An extract which has been concentrated to a content of from 70 to 85% is passed via 1 into a heated mixing vessel 4. The extract is then mixed in a ratio of 1:6 with pure caprolactam 2 and optionally chain regulators and other additives 3 in the heated mixing vessel 4 by recirculating the mixture by means of a pump 5. The pump 5' then feeds the mixture into the heat exchanger 6 and into the reaction zone 7 while at the same time the desired pressure of from 5 to 40 bar is generated. The heat exchanger 6 then provides heating to temperatures from 220 to 300° C. The reaction mixture is polymerized in the first reaction zone 7. Here the pressure is adjusted so that the solution is present as a single liquid phase at the temperature used. Owing to the exothermic polymerization, the temperature of the reaction mixture rises by from about 20 to 50° C. by the end of the first reaction zone 7 while the reaction mixture stays a single liquid phase. The water content of from 2 to 7% catalyzes the polymerization, so that a conversion of >87% is reached after about 1 h. The prepolymer produced is then subjected, via a valve 8, to a flash evaporation to release the predominant portion of the water. In the course of this adiabatic expansion, the prepolymer cools down by from about 6 to 7° C. per 1% of water released. If desired after addition of further caprolactam and other suitable monomers and miscellaneous additives through a lock gate 9, the polymerization is then generally continued in the postcondensation zone 10 at about atmospheric pressure and a water content of <0.4%. The water vapor released at 8 is separated from the entrained volatile organics in a column 11 and removed at 12. The organics are returned into the process at 13. The polyamide discharged from the postcondensation zone 10 can then be further processed in a conventional manner.

Figure 2:
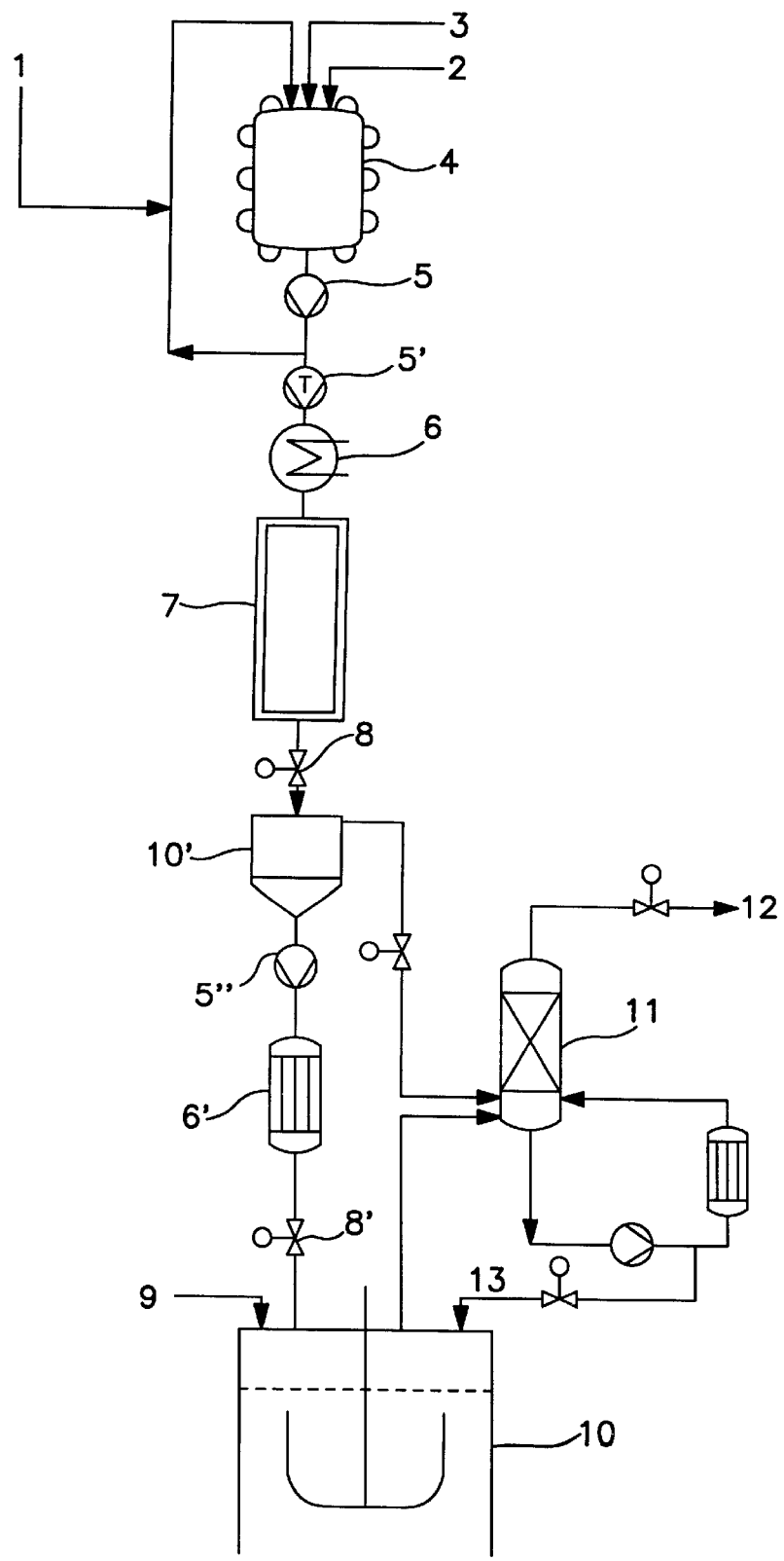
FIG. 2 shows schematically the embodiment of FIG. 1 featuring two-stage flash evaporation.

FIG. 2 shows schematically an embodiment of the inventive process for recycling wash water extract concentrates having an increased water content. A two-stage flash evaporation is used, instead of the one-stage one shown in FIG. 1. As above, the concentrated extract 1 is mixed with caprolactam 2 and optionally additives 3 in a heated vessel 4. The water content in vessel 4 is >8%. This can be the result, for example, of less concentrating or increased wash water extract recycling. The mixing in vessel 4, heating in heat exchanger 6 and polymerization in the first reaction zone 7 is then followed by an adiabatic expansion at 8 to a pressure of from 6 to 15 bar in a first separation zone 10'. A pump 5" and a heat exchanger 6' then reestablishes once more conditions of from 230 to 310° C. and of from 6 to 20 bar. A further adiabatic expansion is carried out at 8' to from 10 to 1300 mbar into a postcondensation zone 10 by continuing the polymerization, with or without addition of further monomers and/or additives, at 9. The released water vapor is freed in a column 11 from its volatile organics, which are returned into the process at 13, while the water vapor is removed at 12. The polyamide discharged from the postcondensation zone 10 can then be further processed in a conventional manner.

The Examples which follow illustrate the process of the present invention. Unless otherwise stated, amounts and percentages are by weight.

EXAMPLE 1

22.5 kg/h of unextracted nylon 6 chips produced with the addition of 0.3% of pretreated titanium dioxide as white pigment are extracted with 22.5 kg/h of countercurrent hot water. The resulting 10% strength aqueous extract includes not only about 7.5% of caprolactam monomer and about 2.5% of oligomers but also traces of inorganic compounds (silicon, manganese, phosphorus and aluminum compounds) on the order of from 1 to 8 ppm, which originate from the pretreatment of the titanium dioxide. The hot extract is then concentrated in a single-stage evaporator at 108° C. to an organics and inorganics content of 78%. As shown in FIG. 1, the hot solution 1 is pumped at a throughput of 3.2 kg/h into a heated mixing vessel 4 and mixed therein with 20 kg/h of fresh lactam 2. The mixing is achieved by pumped recirculation of the solution. The recirculation rate is 2–3 $m^3/h$. Mixing vessel 4 develops a temperature within the range from 90 to 95° C. and a water concentration of 3.0%. The recirculation and especially the high lactam excess are responsible for a stable single phase solution being obtained and the formation of organic precipitates being avoided. The reaction solution is fed via a pump 5' at a throughput of 23.2 kg/h into a heated heat exchanger 6 having a transfer area of 6 $m^2$ and an inlet temperature of 270° C. and heated up to 260° C. in the course of 2 minutes. The pressure side of the pump 5' is adjusted to a pressure of 17 bar to ensure the single phase nature of the reaction system. The heated reaction mixture is then pumped through a heated cylindrical tube 7 120 mm in internal diameter and 2500 mm in length, which is packed with 5 mm Raschig rings with crosspiece and has a jacket temperature of 270° C. The residence time in the tube is 1.1 h. The product temperature at the downstream end of the tube is 275° C. The reaction mixture, which is under a pressure of about 17 bar, is continuously decompressed at the downstream end of the tube to atmospheric via a control valve 8 and passes into a heated cylindrical separation vessel 10. The reaction mixture separates into two phases in the process, and the water present therein evaporates through utilization of the enthalpy of the polymer melt. The temperature of the polymer melt therefore decreases by 15° C. to 260° C. The vapors released in the course of decompression are passed through a packed rectifying column 11 having 6 theoretical plates. The water vapor 12 is removed from the system overhead, whereas caprolactam monomer and oligomers are removed as bottom product 13 and returned into the separator 10. The overhead water vapor 12 comprises less than 0.1% of caprolactam. Pretreated titanium dioxide is added as a white pigment concentrate to nylon 6 in the stirred separation vessel 10 via a lock gate 9 and uniformly mixed in. Following a residence time of 10 h in the separation vessel 10, which also serves as postreaction zone, the polymer is continuously pumped by a melt pump from the base of the postreactor via a die into a water bath in the form of melt profiles, which are solidified in the water bath and pelletized.

The polymer thus prepared has a viscosity number (measured as a 0.5% strength by weight solution in 96% strength by weight sulfuric acid at 25° C.) of 115 ml/g and a low molecular weight content of 11%. The titanium dioxide content is 0.3%. The polymer is subsequently extracted with countercurrent hot water and then dried and tempered until a viscosity number of 130 ml/g is reached.

The dilute extract waters produced in the extraction stage are concentrated by the above-described process and returned into the polymerization stage.

EXAMPLE 2

22.5 kg/h of unextracted nylon 6 chips produced with the addition of 0.3% of pretreated titanium dioxide as white pigment are extracted with 22.5 kg/h of countercurrent hot water. The resulting 10% strength aqueous extract includes not only about 7.5% of caprolactam monomer and about 2.5% of oligomers but also traces of inorganic compounds (silicon, manganese, phosphorus and aluminum compounds) which originate from the pretreatment of the titanium dioxide. The hot extract is diluted with 1.2 kg/h of fresh lactam to stabilize it against oligomer precipitations and then concentrated in a single-stage evaporator at 109° C. to an organics and inorganics content of 84%. The hot solution 1 is pumped at a throughput of 4.4 kg/h into a heated mixing vessel 4 and mixed therein with a further 18.8 kg/h of fresh lactam 2. The mixing is achieved by pumped recirculation of the solution. The recirculation rate is 2–3 $m^3/h$. Mixing vessel 4 develops a temperature within the range from 90 to 95° C. and a water concentration of 3.0%. The recirculation and especially the high lactam excess are responsible for a stable single phase solution being obtained and the formation of organic precipitates being avoided. The reaction solution is fed via a pump 5' at a throughput of 23.2 kg/h into a heated heat exchanger 6 having a transfer area of 6 $m^2$ and an inlet temperature of 270° C. and heated up to 260° C. in the course of 2 minutes. The pressure side of the pump 5' is adjusted to a pressure of 17 bar to ensure the single phase nature of the reaction system. The heated reaction mixture is then pumped through a heated cylindrical tube 7 120 mm in internal diameter and 2500 mm in length, which is packed with 5 mm Raschig rings with crosspiece and has a jacket temperature of 270° C. The residence time in the tube 7 is 1.1 h. The product temperature at the downstream end of the tube is 275° C. The reaction mixture, which is under a pressure of about 17 bar, is continuously decompressed at the downstream end of the tube to atmospheric via a control valve 8 and passes into a heated cylindrical separation vessel 10. The reaction mixture separates into two phases in the process, and the water present therein evaporates through utilization of the enthalpy of the polymer melt. The temperature of the polymer melt therefore decreases by 14° C. to 261° C. The vapors released in the course of decompression are passed through a packed rectifying column 11 having 6 theoretical plates. The water vapor 12 is removed from the system overhead, whereas caprolactam monomer and oligomers are removed as bottom product 13 and returned into the separator 10. The overhead water vapor 12 comprises less than 0.1% of caprolactam. Pretreated titanium dioxide is added as a white pigment concentrate to nylon 6 in the stirred separation vessel 10 via a lock gate 9 and uniformly mixed in. Following a residence time of 10 h in the separation vessel 10, which also serves as postreaction zone, the polymer is continuously pumped by a melt pump from the base of the postreactor via a die into a water bath in the form of melt profiles, which are solidified in the water bath and pelletized.

The polymer thus prepared has a viscosity number (measured as a 0.5% strength by weight solution in 96% strength by weight sulfuric acid at 25° C.) of 117 ml/g and a low molecular weight content of 10.8%. The titanium dioxide content is 0.3%. The polymer is subsequently extracted with countercurrent hot water and then dried and tempered until a viscosity number of 127 ml/g is reached.

The dilute extract waters produced in the extraction stage are concentrated by the above-described process and returned into the polymerization stage.

The process described in Examples 1) and 2) was continuously operated for a period of 12 weeks with closed loops, which corresponds to an average number of about 50 recycles of the concentrated extract into the polymerization. Throughout this period, no organics or inorganics were observed to precipitate during the process, especially not on heat exchanger surfaces.

We claim:

1. A process for preparing polyamides from at least one lactam with or without further monomers and additives selected from the group consisting of pigments, chain regulators, stabilizers, nucleating agents, catalysts and fillers, which comprises
    a) concentrating the wash water extract from the extraction of polyamide to an extractables content of not more than 85% by weight,
    b) adjusting the water content of the resulting concentrate to from 0.5 to 13% by weight by addition of fresh lactam,
    c) subjecting the resulting mixture to a polymerization under polyamide-forming conditions, and
    d) effecting at least one adiabatic expansion during the polymerization to reduce the water content.

2. A process as claimed in claim 1, wherein the wash water extract is concentrated to an extractables content of from 70 to 85% by weight.

3. A process as claimed in claim 1, wherein the wash water extract comes from the extraction of pigmented polyamide.

4. A process as claimed in claim 1, wherein a portion of the fresh lactam added in step b) is added prior to said concentrating.

5. A process as claimed in claim 1, wherein the water content is adjusted to from 0.5 to 10% by weight in step b).

6. A process as claimed in claim 1, wherein the water content is adjusted to from 2 to 4% by weight in step b).

7. A process as claimed in claim 1, wherein the mixture in step c) is brought to a temperature within the range from 230 to 310° C. and to a pressure within the range from 5 to 40 bar, then at least one adiabatic expansion is effected, and the product obtained after said expansion is postpolymerized in at least one reaction zone.

8. A process as claimed in claim 7, wherein the product obtained after said expansion is further polymerized in a first reaction zone at a temperature within the range from 230 to 310° C. and at a pressure within the range from 5 to 40 bar, then subjected to another adiabatic expansion and finally postpolymerized in a second reaction zone.

9. A process as claimed in claim 1, wherein the mixture obtained from step b) is polymerized in a first reaction zone at a temperature within the range from 230 to 310° C. and at a pressure within the range from 5 to 40 bar, then adiabatically expanded and postpolymerized in a further reaction zone.

10. A process as claimed in claim 7, wherein said adiabatic expansion is performed to a pressure within the range from 0.1 mbar to 1.5 bar.

11. A process as claimed in claim 9, wherein the mixture obtained from step b) is polymerized in a first reaction zone at a temperature within the range from 230 to 310° C. and at a pressure within the range from 5 to 40 bar, then an adiabatic expansion is effected to a pressure within the range from 6 to 15 bar, and the expanded product is again brought to a temperature within the range from 230 to 310° C. and to a pressure within the range from 5 to 40 bar, then subjected to a further adiabatic expansion to a pressure within the range from 0.1 mbar to 1.5 bar and finally postpolymerized.

12. A process as claimed in claim 7, wherein the postpolymerization is performed at a temperature which is from 5 to 20° C. lower than that of the preceding polymerization, especially at from 260 to 270° C.

13. A process as claimed in claim 1, wherein the lactam used is caprolactam.

14. A process as claimed in claim 9, wherein said adiabatic expansion is performed to a pressure within the range from 0.1 mbar to 1.5 bar.

15. A process as claimed in claim 9, wherein the postpolymerization is performed at a temperature which is from 5 to 20° C. lower than that of the preceding polymerization, especially at from 260 to 270° C.

* * * * *